United States Patent
Huang

(10) Patent No.: US 7,565,069 B2
(45) Date of Patent: Jul. 21, 2009

(54) IMAGE DETECTION DEVICE AND LOCATOR THEREOF

(75) Inventor: Yao-Ching Huang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 288 days.

(21) Appl. No.: 11/616,418

(22) Filed: Dec. 27, 2006

(65) Prior Publication Data
US 2008/0056695 A1 Mar. 6, 2008

(30) Foreign Application Priority Data
Sep. 6, 2006 (TW) .............................. 95132878 A

(51) Int. Cl.
G03B 17/00 (2006.01)
B23Q 3/02 (2006.01)
B25B 1/02 (2006.01)
B25B 5/00 (2006.01)

(52) U.S. Cl. .............................. 396/55; 269/91; 269/97; 269/143; 269/249

(58) Field of Classification Search .................... 396/12, 396/52, 55, 214, 419, 421, 424, 425, 428, 396/529, 535, 661; 76/78.1; 269/91, 97, 269/143, 249
See application file for complete search history.

(56) References Cited

U.S. PATENT DOCUMENTS

| | | | | |
|---|---|---|---|---|
| 1,664,932 A | * | 4/1928 | Juricinec | 81/126 |
| 5,774,980 A | * | 7/1998 | Klein et al. | 29/857 |
| 5,900,995 A | * | 5/1999 | Akada et al. | 359/824 |
| 6,377,754 B1 | * | 4/2002 | Sugita et al. | 396/132 |
| 2002/0185800 A1 | * | 12/2002 | Duncan | 269/242 |
| 2006/0196317 A1 | * | 9/2006 | Kinskey | 81/63.1 |
| 2006/0230884 A1 | * | 10/2006 | Picone | 81/165 |
| 2007/0002147 A1 | * | 1/2007 | Nomura et al. | 348/208.11 |
| 2007/0182825 A1 | * | 8/2007 | Nomura et al. | 348/208.99 |

* cited by examiner

Primary Examiner—Patrick J Assouad
Assistant Examiner—Dennis Hancock
(74) Attorney, Agent, or Firm—Thomas, Kayden, Horstemeyer & Risley

(57) ABSTRACT

A locator comprises a first clamping element, a second clamping element opposite to the first clamping element, a guide bar extending through the first clamping element and the second clamping element, and a transmitting element rotatably disposed between the first clamping element and the second clamping element and abutting the first and second clamping elements. When the transmitting element rotates, the first clamping element and the second clamping element move along the guide bar to approach or move away each other, thereby clamping or releasing an object.

21 Claims, 7 Drawing Sheets

IMAGE DETECTION DEVICE AND LOCATOR THEREOF

BACKGROUND OF THE INVENTION

1. Field of the Invention

The invention relates to a locator, and more particularly to a locator positioning an object by clamping.

2. Description of the Related Art

Conventional digital cameras often comprise an anti-vibration function. When the anti-vibration function is initiated, a moving seat bearing an image detection unit moves to compensate vibration. When the anti-vibration function is temporarily halted, the moving seat must be fixed.

BRIEF SUMMARY OF THE INVENTION

A locator for temporarily fixing a moving seat of a digital camera is provided.

An exemplary embodiment of a locator comprises a first clamping element, a second clamping element opposite the first clamping element, a guide bar extending through the first clamping element and the second clamping element, a transmitting element rotatably disposed between the first clamping element and the second clamping element abutting the first and second clamping elements. When the transmitting element rotates, the first clamping element and the second clamping element move along the guide bar to approach or move away each other, thereby clamping or releasing an object.

The transmitting element comprises a central hole formed at the center of the transmitting element, a first surface on which a first groove is formed, a second surface on which a second groove is formed. The first clamping element abuts the bottom of the first groove, the second clamping element abuts the bottom of the second groove. When the transmitting element rotates about the central hole, the first clamping element and the second clamping element move along the guide bar to approach or move away each other.

The first groove is annular and centered at the central hole and comprises a first position where the bottom of the first groove is highest and a second position adjacent to the first position, where the bottom of the first groove is lowest. The second groove is annular and centered at the central hole and comprises a third position where the bottom of the second groove is highest and a fourth position adjacent to the third position, where the bottom of the second groove is lowest. The first position corresponds to the third position and the second position corresponds to the fourth position. The bottom height of the first groove decreases from the first position to the second position, and the bottom height of the second groove decreases from the third position to the fourth position. The first clamping element comprises a first protrusion abutting the bottom of the first groove, and the second clamping element comprises a second protrusion abutting the bottom of the second groove.

The locator further comprises a base and an upper cover joined to the base. The guide bar connects the upper cover and the base, and the first clamping element and the second clamping element are disposed between the upper cover and the base.

The locator further comprises a first spring disposed between the upper cover and the first clamping element and biasing the first clamping element, and a second spring disposed between the second clamping element and the base and biasing the second clamping element.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 3c is a top view of FIG. 3a;

FIG. 5b is a cross section of FIG. 5a;

FIG. 6b a cross section of FIG. 6a.

DETAILED DESCRIPTION OF INVENTION

Figure 1:
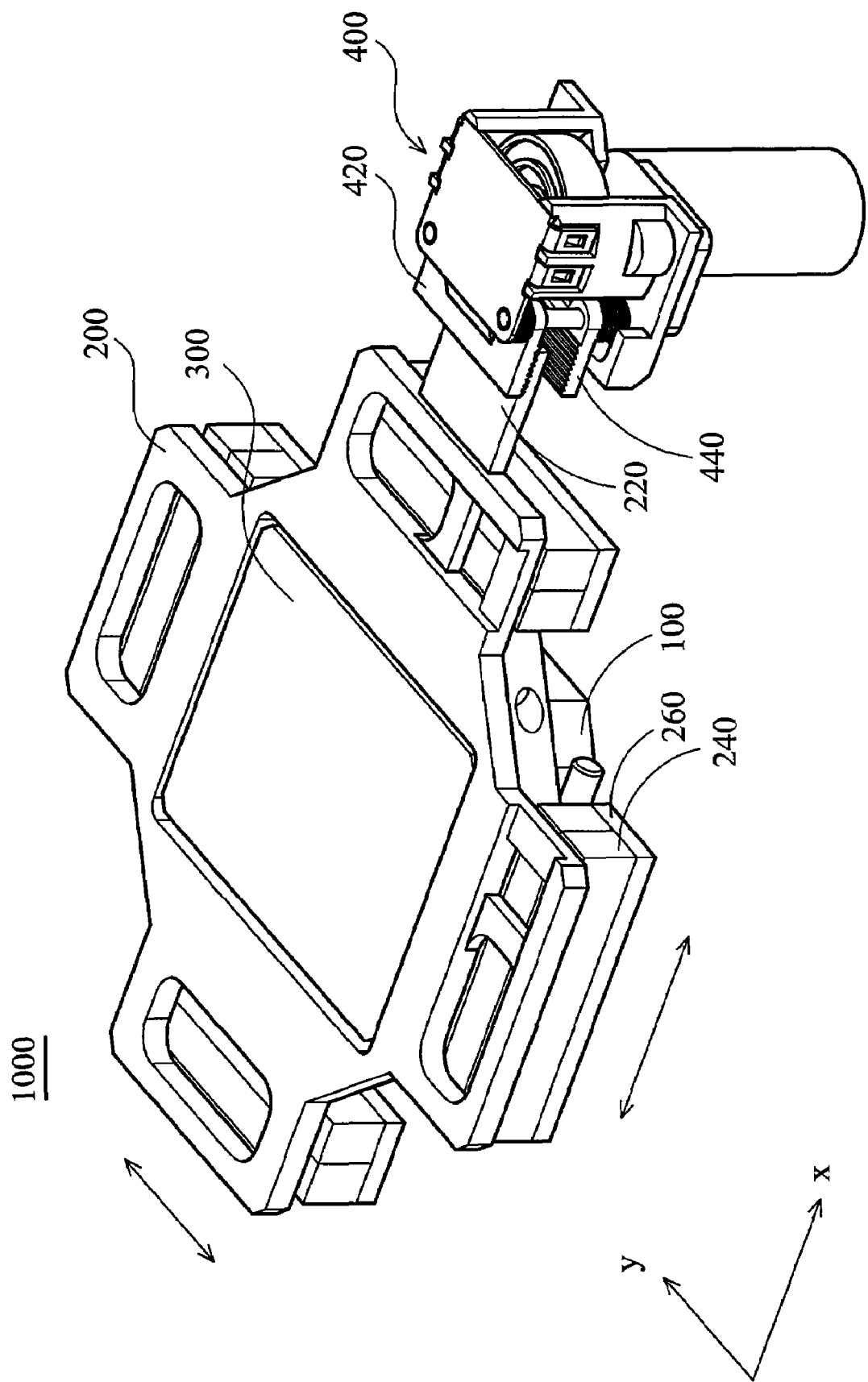
FIG. 1 is a schematic view of an image detection device of the invention.

Referring to FIG. 1, an image detection device 1000 comprises a fixed seat 100, a moving seat 200, an image detection unit 300 and a locator 400. The image detection unit 300 is disposed on the moving seat 200 which is moved on the fixed seat 100 along a direction x and a direction y by a magnet 240 and a coil 260. The moving seat 200 comprises a holding portion 220, which is a plate extending from the moving seat 200. The locator 400 comprises a first clamping element 420 and a second clamping element 440. The moving seat 200 is fixed by the first clamping element 420 and the second clamping element 440 clamping the holding portion 220.

Figure 2:
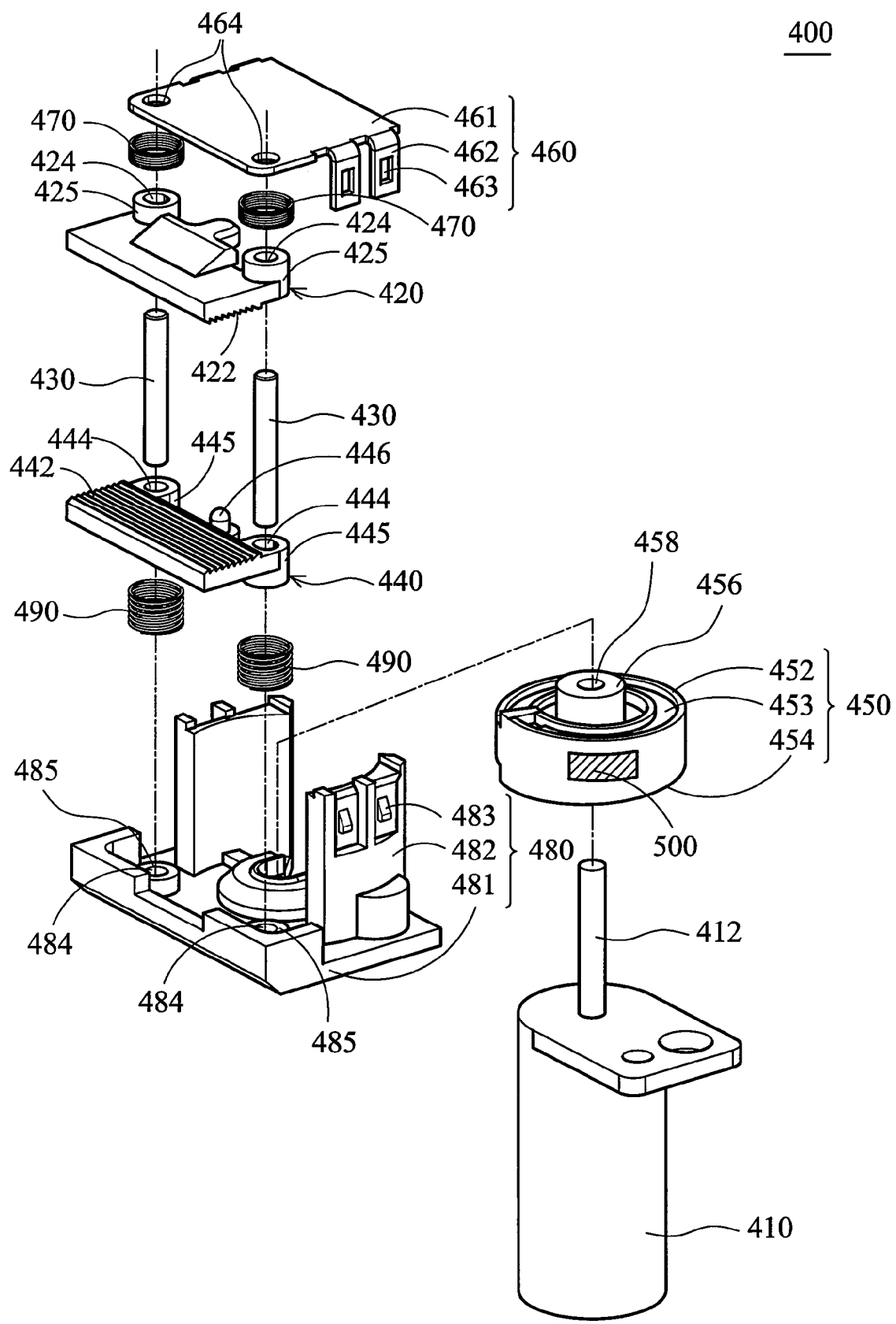
FIG. 2 is an exploded view of an image detection device of the invention.

Referring to FIG. 2, the locator 400 comprises a motor 410, a first clamping element 420, two guide bars 430, a second clamping element 440, a transmitting element 450, an upper cover 460, two first springs 470, a base 480 and two second springs 490. The base 480 comprises a main body 481 and two walls 482 projecting from the main body 481. Each wall 482 comprises a wedge 483. The upper cover 460 comprises a main body 461 and four flanges 462 projecting from the main body 461. Each flange 462 comprises a hole 463 corresponding to the wedge 483. The wedge 483 engages the hole 463, whereby the upper cover 460 is joined to the base 480. The main body 481 of the base 480 comprises two through holes 484, and the main body 461 of the upper cover 460 also comprises two through holes 464. The guide bars 430 extend through the through holes 464 and 484 to connect the upper cover 460 and the base 480.

Figure 5A:
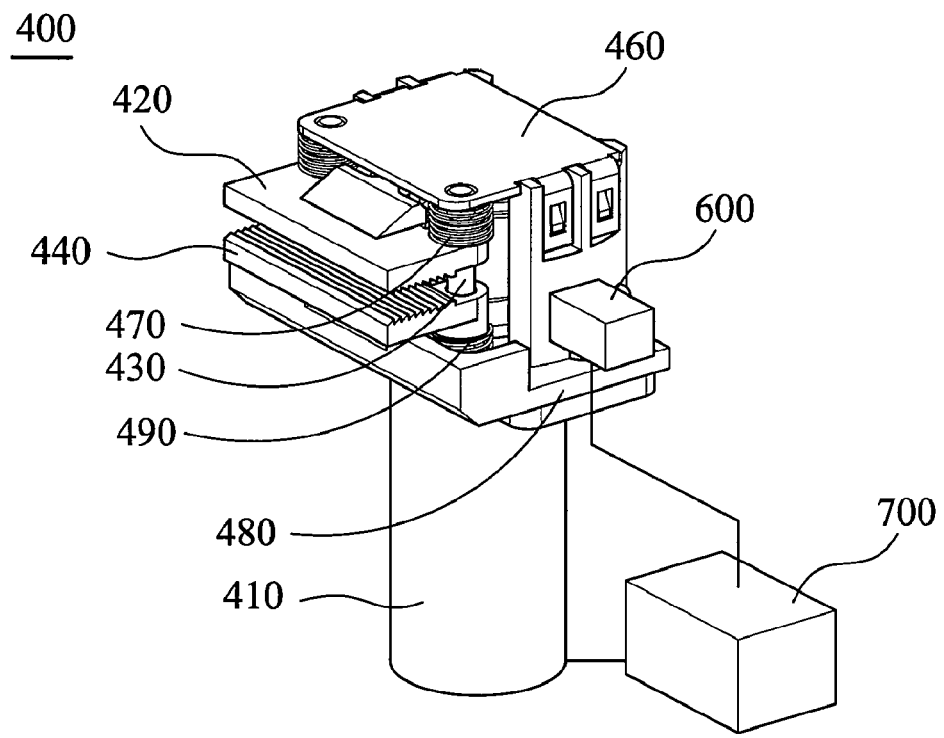
FIG. 5a is a perspective view of the locator clamping the moving seat.
Figure 5B:
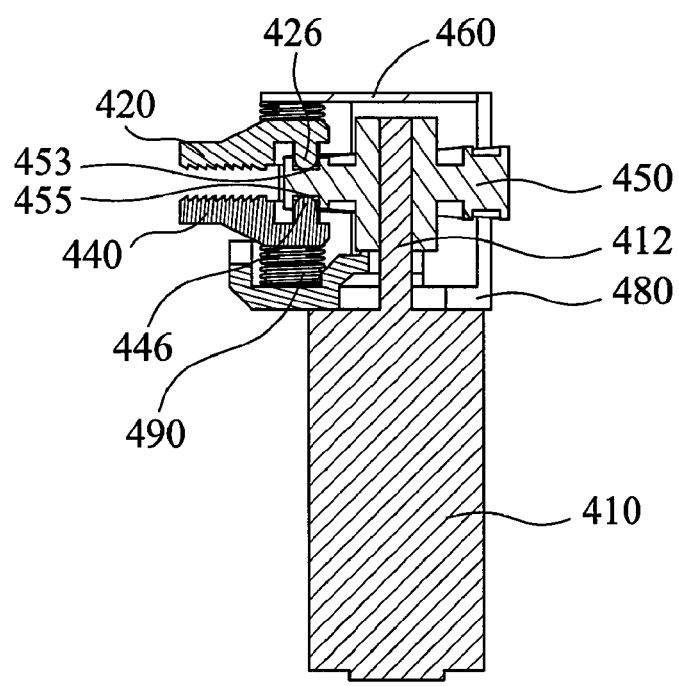

The first clamping element 420 is substantially a plate comprises a first clamping portion 422, two posts 425 and a first protrusion 426 (shown in FIG. 5b). Each post 425 comprises a through hole 424. The second clamping element 440 opposite to the first clamping element 420 comprises a second clamping portion 442, two posts 445 and a second protrusion 446. Each post 445 comprises a through hole 444. The first clamping portion 422 faces the second clamping portion 442. The guide bars 430 extend through the through holes 424 and 444, whereby the first clamping portion 420 and second clamping portion 440 move along the guide bars 430 to clamp or release the holding portion 220.

The first spring 470 is positioned on the post 425, disposed between the upper cover 460 and the first clamping element 420 and biases the first clamping element 420. The second spring 490 is positioned on the post 485 of the base 480, disposed between the second clamping element 440 and the base 480 and biases the second clamping element 440. The transmitting element 450 is disposed between the two walls 482 and also between the first clamping element 420 and second clamping element 440.

Referring to FIGS. 3a, 3b, 3c and 3d, the transmitting element 450 is substantially a cylinder and comprises a first surface 452, a second surface 454 and a central shaft 456. The central shaft 456 comprises a central hole 458 with which a shaft 412 of the motor 410 engages. The motor 410 powers the transmitting element 450 to rotate about the central hole 458. An annular first groove 453 is formed on the first surface 452, and an annular second groove 455 is formed on the second surface 455. The first protrusion 426 abuts the bottom of the first groove 453, and the second protrusion 446 abuts the bottom of the second groove 455.

Figure 3B:
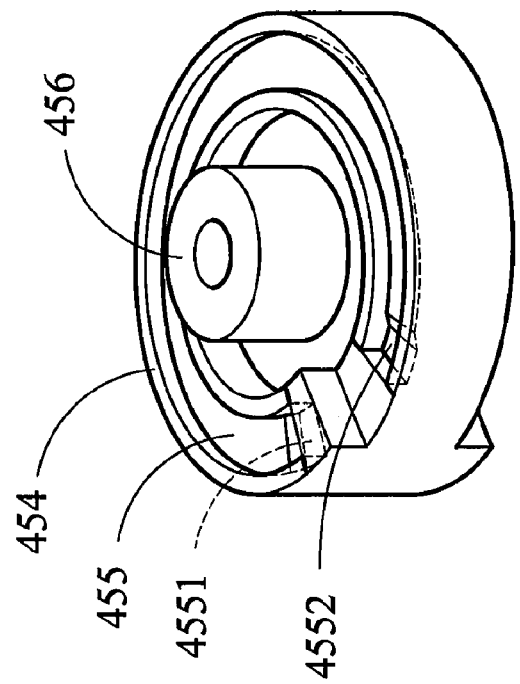
FIG. 3b is another perspective view of a transmitting element of the invention.
Figure 3A:
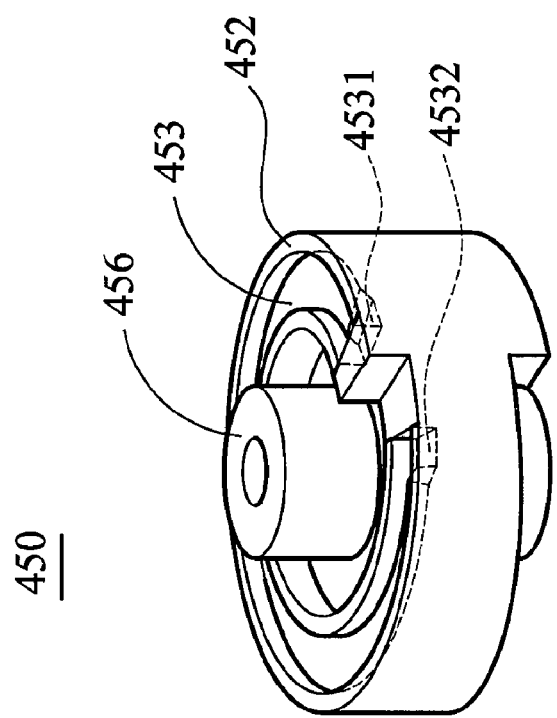
FIG. 3a is a perspective view of a transmitting element of the invention.
Figure 3D:
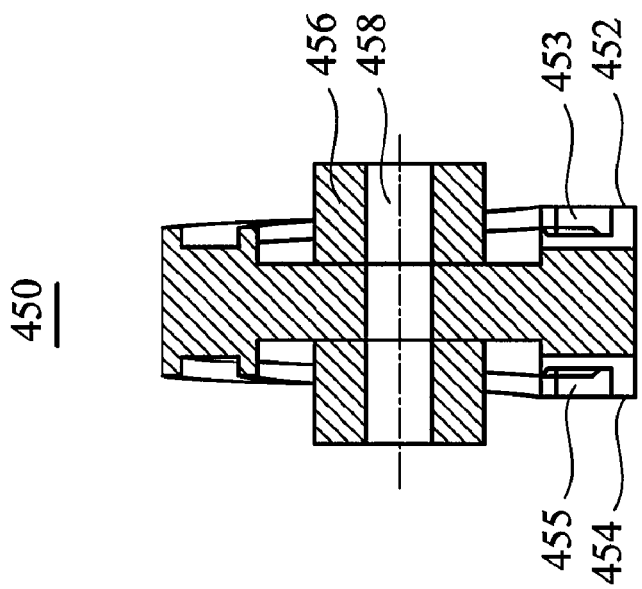
FIG. 3d is a cross section along line A-A.
Figure 3C:
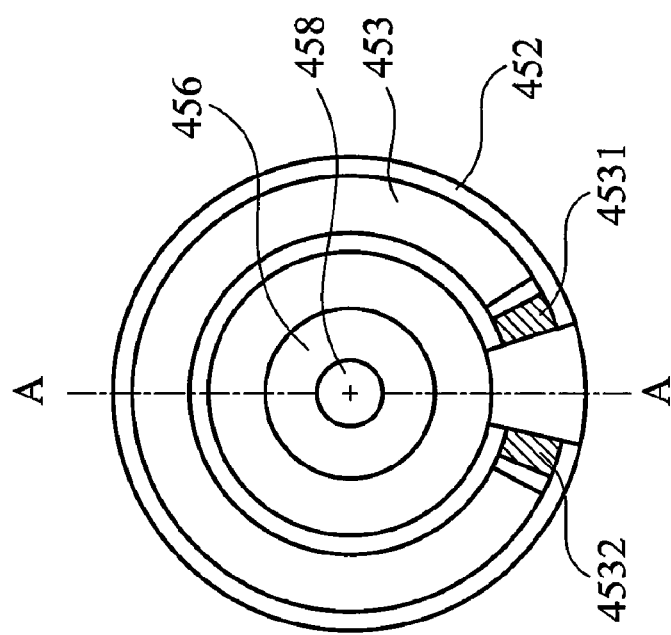
Figure 4:
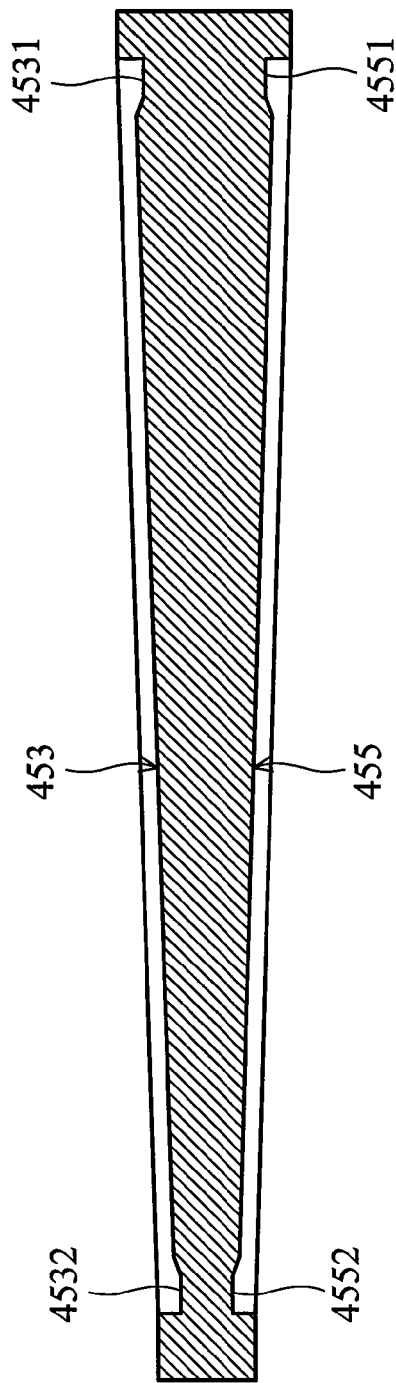
FIG. 4 depicts the stretched first and second grooves.

In FIG. 3a, the first groove 453 comprises a first position 4531 and a second position 4532. Referring to FIG. 3c, the first position 4531 is adjacent to the second position 4532. The first groove 453 is formed by circling an inclined groove where the first position 4531 is a highest position and the second position 4532 is a lowest position of the inclined groove. FIG. 4 depicts the stretched first groove 453 and second groove 455. Similarly, the second groove 455 is also formed by circling an inclined surface, which comprises a third position 4551 which is the highest position thereof and a fourth position 4552 which is the lowest position thereof. The first position 4331 corresponds to the third position 4551, and the second position 4332 corresponds to the fourth position 4552.

Figure 6A:
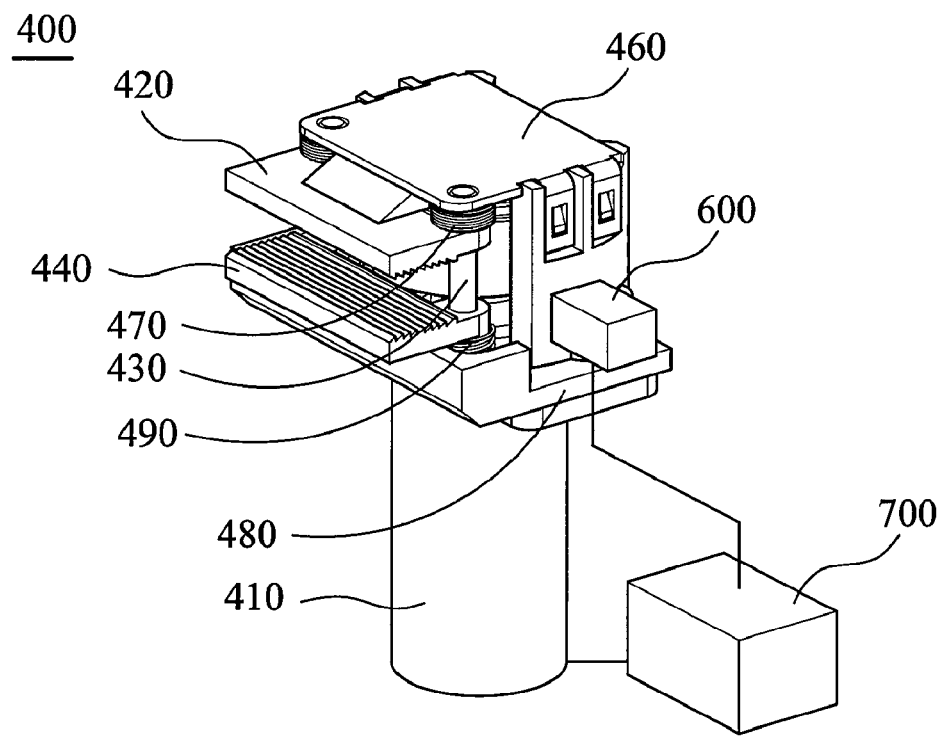
FIG. 6a is a perspective view of the locator releasing the moving seat.
Figure 6B:
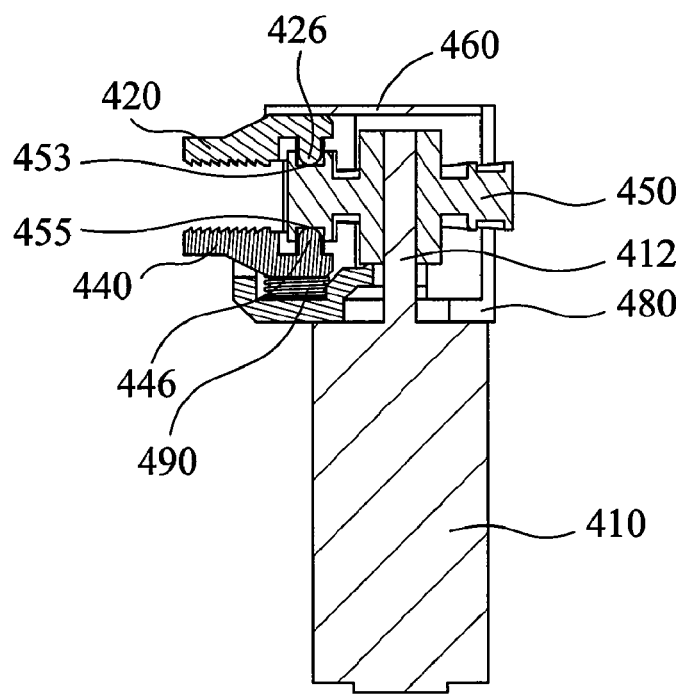

As the first protrusion 426 abuts the first groove 453 and the second protrusion 446 abuts the second groove 455, when the transmitting element 450 is rotated and the first clamping element 420 moves from the first position 4531 to the third position 4551 and the second clamping element 440 moves from the third position 4551 to the fourth position 4552, the first clamping element 420 and the second clamping element 440 moves along the guide bars 430 to approach each other, thereby clamping the holding position 220, as shown in FIGS. 5a, 5b. When the first clamping element 420 moves from the second position 4532 to the first position 4531 and the second clamping element 440 moves from the fourth position 4552 to the third position 4551, the first clamping element 420 and the second clamping element 440 moves along the guide bars 430 to move away each other, thereby releasing the holding portion 220, as shown in FIGS. 6a and 6b.

The first spring 470 and the second spring 490 bias the first clamping element 420 and the second clamping element 440 respectively to ensure that the first protrusion 426 abuts the first groove 453 and the second protrusion 446 abuts the second groove 455.

The motor 410 can be a stepping motor. A sensing portion 500 is formed on the lateral side of the transmitting element 450 as shown in FIG. 2, and a position sensor 600 is disposed outside the locator 400 as shown in FIGS. 5a and 6a. The position sensor 600 is connected to a control unit 700. When the position sensor 600 detects the sensing portion 500, it sends a signal to the control unit 700 to stop the motor 410, whereby the transmitting element is positioned.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A locator, comprising
    a first clamping element;
    a second clamping element opposite to the first clamping element;
    a guide bar extending through the first clamping element and the second clamping element, thereby the first and second clamping elements sliding along the guide bar; and
    a transmitting element rotatably disposed between the first clamping element and the second clamping element and abutting the first and second clamping elements, comprising:
        a central hole;
        a first groove, annularly centered at the central hole and comprising a first position where the bottom of the first groove is highest and a second position adjacent to the first position, where the bottom of the first groove is lowest; and
        a second groove annularly centered at the central hole and comprising a third position where the bottom of the second groove is highest and a fourth position adjacent to the third position, where the bottom of the second groove is lowest;
    wherein when the transmitting element rotates, the first clamping element and the second clamping element move along the guide bar to approach or move away each other, thereby clamping or releasing an object.

2. The locator as claimed in claim 1, wherein the transmitting element further comprises:
    a first surface on which the first groove is formed thereon; and
    a second surface on which second groove is formed thereon, wherein the first clamping element abuts the bottom of the first groove, the second clamping element abuts the bottom of the second groove, and when the transmitting element rotates about the central hole thereof, the first clamping element and the second clamping element move along the guide bar to approach or move away each other.

3. The locator as claimed in claim 1, wherein the first position corresponds to the third position and the second position corresponds to the fourth position.

4. The locator as claimed in claim 1, wherein the bottom height of the first groove decreases from the first position to the second position, and the bottom height of the second groove decreases from the third position to the fourth position.

5. The locator as claimed in claim 1, wherein the first clamping element comprises a first protrusion abutting the bottom of the first groove, and the second clamping element comprises a second protrusion abutting the bottom of the second groove.

6. The locator as claimed in claim 1 further comprising:
    a base; and
    an upper cover joined to the base, wherein the guide bar connects the upper cover and the base, and the first clamping element and the second clamping elements are disposed between the upper cover and the base.

7. The locator as claimed in claim 6 further comprising:
a first spring disposed between the upper cover and the first clamping element and biasing the first clamping element; and
a second spring disposed between the second clamping element and the base and biasing the second clamping element.

8. The locator as claimed in claim 1 further comprising a motor having a shaft joined to the central hole of the transmitting element, whereby the motor rotates the transmitting element.

9. The locator as claimed in claim 8, wherein the motor is a stepping motor.

10. The locator as claimed in claim 8 further comprising a position sensor, wherein the transmitting element comprises a sensing portion, and when the position sensor detects the sensing portion, the motor halts.

11. An image detection device, comprising:
a fixed seat;
a moving seat movably disposed on the fixed seat and having a holding portion;
an image detection unit disposed on the moving seat; and
a locator clamping or releasing the holding portion to fix or release the moving seat, comprising:
a first clamping element;
a second clamping element opposite to the first clamping element; and
a transmitting element rotatably disposed between the first and second clamping elements and abutting the first and second clamping elements, comprising:
a central hole;
a first groove, annularly centered at the central hole and comprising a first position where the bottom of the first groove is highest and a second position adjacent to the first position, where the bottom of the first groove is lowest; and
a second groove annularly centered at the central hole and comprising a third position where the bottom of the second groove is highest and a fourth position adjacent to the third position, where the bottom of the second groove is lowest;
wherein when the transmitting element rotates, the first and second clamping elements approach or move away each other.

12. The image detection device as claimed in claim 11, wherein the locator further comprises:
guide bar extending through the first clamping element and the second clamping element, thereby the first and second clamping elements sliding along the guide bar;
when the transmitting element rotates, the first clamping element and the second clamping element moving along the guide bar to approach or move away each other, thereby clamping or releasing an object.

13. The image detection device as claimed in claim 11, wherein the transmitting element further comprises:
a first surface on which first the groove is formed;
a second surface on which the second groove is formed, wherein the first clamping element abuts the bottom of the first groove, the second clamping element abuts the bottom of the second groove, and when the transmitting element rotates about the central hole thereof, the first clamping element and the second clamping element moving along the guide bar to approach or move away each other.

14. The image detection device as claimed in claim 11, wherein the first position corresponds to the third position and the second position corresponds to the fourth position.

15. The image detection device as claimed in claim 11, wherein the bottom height of the first groove decreases from the first position to the second position, and the bottom height of the second groove decreases from the third position to the fourth position.

16. The image detection device as claimed in claim 11, wherein the first clamping element comprises a first protrusion abutting the bottom of the first groove, and the second clamping element comprises a second protrusion abutting the bottom of the second groove.

17. The image detection device as claimed in claim 12, wherein the locator further comprises:
a base; and
an upper cover joined to the base, wherein the guide bar connects the upper cover and the base, and the first clamping element and the second clamping elements are disposed between the upper cover and the base.

18. The image detection device as claimed in claim 17, wherein the locator further comprises:
a first spring disposed between the upper cover and the first clamping element and biasing the first clamping element; and
a second spring disposed between the second clamping element and the base and biasing the second clamping element.

19. The image detection device as claimed in claim 11, wherein the locator further comprises a motor having a shaft joined to the central hole of the transmitting element, whereby the motor rotates the transmitting element.

20. The image detection device as claimed in claim 19, wherein the motor is a stepping motor.

21. The image detection device as claimed in claim 19, wherein the locator further comprises a position sensor, wherein the transmitting element comprises a sensing portion, and when the position sensor detects the sensing portion, the motor halts.

* * * * *